J. GARRARD.
Grain-Binders.

No. 152,359.

Patented June 23, 1874.

ATTEST.
J. N. Layman.
H. T. Tanner.

Jeptha Garrard
By Knight Bros.
ATT'YS.

J. GARRARD.
Grain-Binders.
No. 152,359.
Patented June 23, 1874.
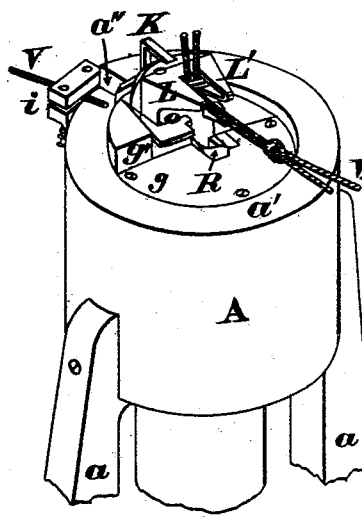
FIG. 7.
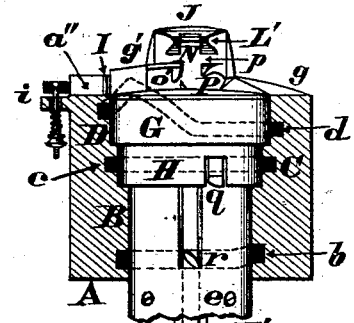
FIG. 8.
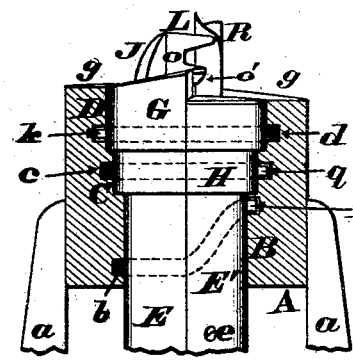
FIG. 9.
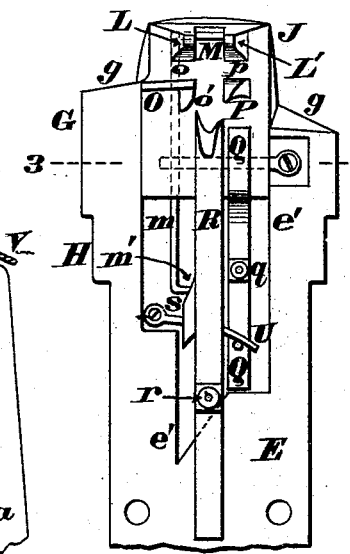
FIG. 10.
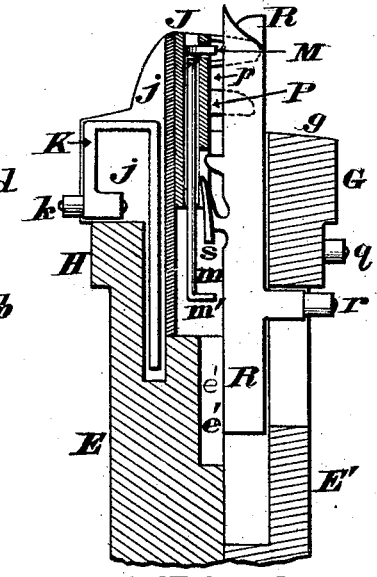
FIG. 11.
FIG. 12.
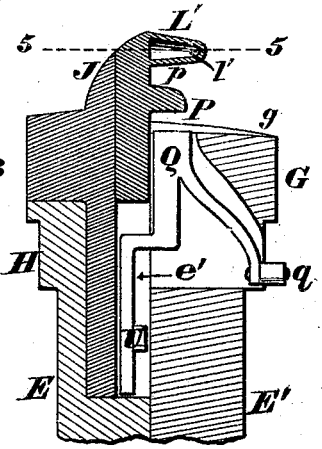
FIG. 13.
FIG. 14.
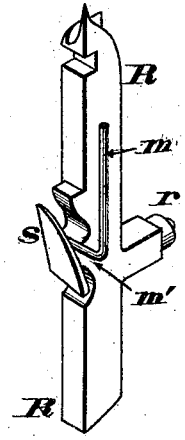
FIG. 15.
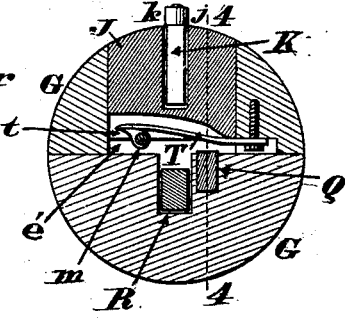
ATTEST.
J. H. Layman
H. J. Tanner
Jeptha Garrard
By Knight Bros.
ATT'YS.

UNITED STATES PATENT OFFICE.

JEPTHA GARRARD, OF CINCINNATI, OHIO.

IMPROVEMENT IN GRAIN-BINDERS.

Specification forming part of Letters Patent No. 152,359, dated June 23, 1874; application filed April 9, 1874.

*To all whom it may concern:*

Be it known that I, JEPTHA GARRARD, of Cincinnati, Hamilton county, Ohio, have invented a new and useful Device for Tying Knots in Bands for Tying Grain, of which the following is a specification:

This invention relates to an automatic device for securely knotting the ends of a cord or other suitable band, after the latter has been passed around a bundle of cut grain, and before it is discharged from the harvester, this surrounding of the bundle with the cord being accomplished either by hand or by any suitable automatic mechanism. My knot-tying device consists essentially of a cylinder or housing, within which is journaled a vertical shaft that has a reciprocating rotary movement imparted to it by being properly geared with any moving part of the harvester. The upper and exposed end of this reciprocating rotary shaft carries the various devices that serve to tie the knot in the cord, which devices are brought into operation in proper succession by the engagement of their respective concealed shanks with suitable spiral or eccentric grooves or shoulders that are formed within or upon the concave face of the inclosing cylinder or housing. These operating devices act successively to nip or clamp the cord, to sever it, to tie a secure knot in it, and then to release and disengage the cord from the implement, and allow the bundle of grain to be discharged from the harvester in a bound condition, as hereinafter fully explained.

Figure 1:
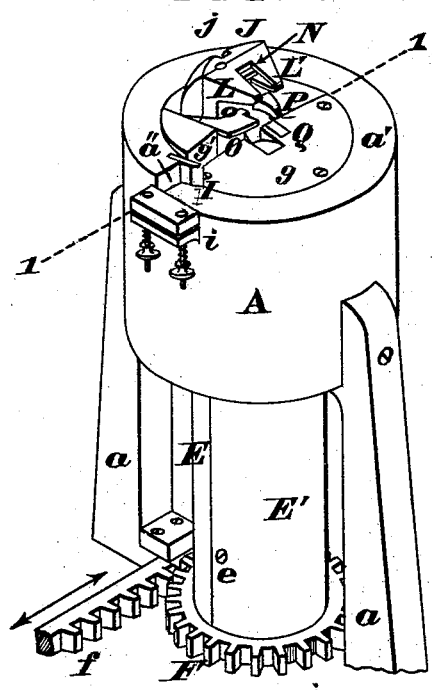
Figure 2:
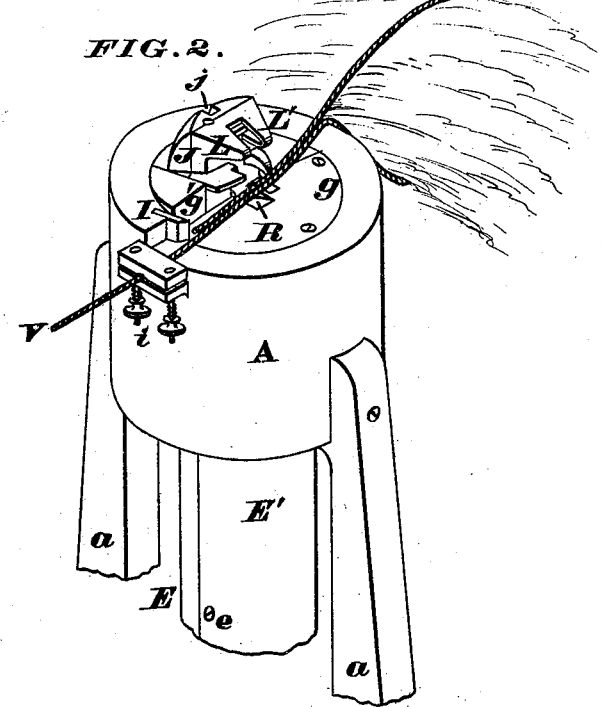
Figure 3:
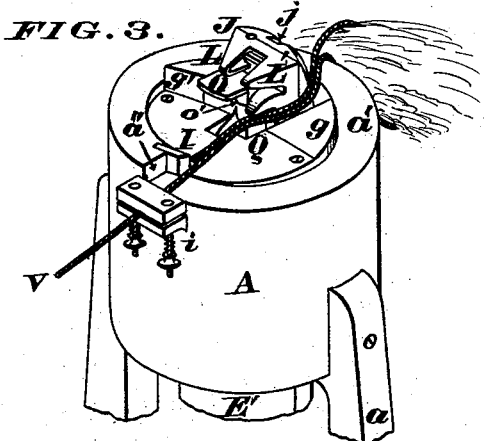
Figure 4:
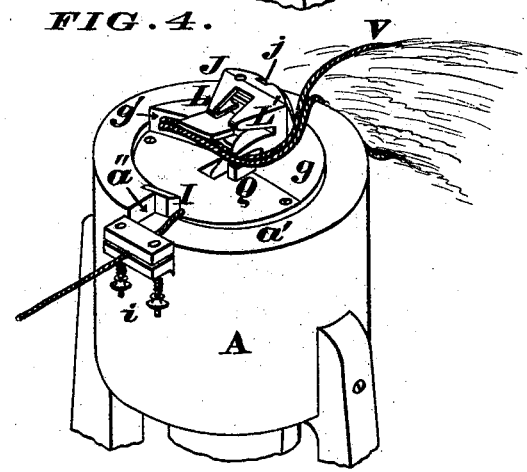
Figure 5:
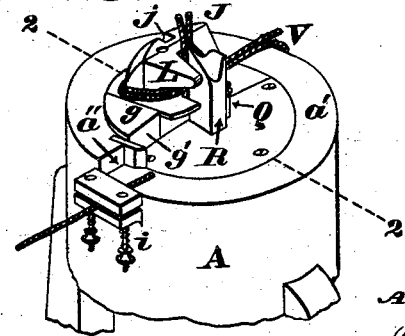
Figure 6:
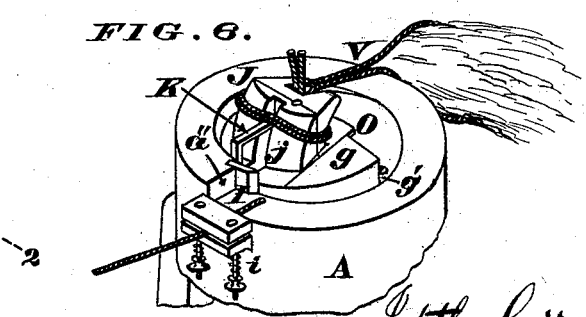

In the accompanying drawings, Figure 1 is a perspective view of my knot-tying device, the operative parts being shown in position to receive the cord or band that is to surround the bundle of cut grain. Fig. 2 is a similar view of the device, but with the cord inserted therein, and passed around a bundle of grain, the operating-rack and gear-wheel being omitted in this illustration. Fig. 3 is a perspective view of the housing and its accessories, the shaft being shown as having made one-fourth of a revolution to the left, and the clamp-bar elevated, so as to nip the cord, which latter is in the act of being severed. Fig. 4 is a perspective view, showing the positions the various operative parts assume after the cord has been severed. Fig. 5 represents the manner in which the cord is wound around the stock of the device, after the shaft has performed an entire revolution, the plunger of said shaft being elevated. Fig. 6 represents the bight of the cord in the act of being shoved over the head of the stock by the vertically-acting push-piece. Fig. 7 represents the push-piece completely elevated, the bight of the cord detached from the stock, and a sure knot tied in the cord. Fig. 8 is a section through the housing at the line 1 1, Fig. 1, the shaft and its accessories being shown in elevation. Fig. 9 is a section through the housing at line 2 2, Fig. 5, the shaft and its accessories being shown in elevation and the plunger protruded. Fig. 10 is a vertical section through the shaft at the line 1 1, Fig. 1, said shaft being detached from its housing. Fig. 11 is a vertical section through the shaft at the line 2 2, Fig. 5. Fig. 12 is a horizontal section through the shaft at line 3 3, Fig. 10. Fig. 13 is a vertical section of the same at the line 4 4. Fig. 14 is a horizontal section through the head of the stock at the line 5 5, Fig. 13; and Fig. 15 is a perspective view of the plunger and latch-shaft detached from the implement.

Of the above illustrations, Figs. 10, 11, 12, 13, 14, and 15 are drawn in an enlarged scale.

A represents the housing of the device, which housing may be of the represented cylindrical or other suitable shape, and may be attached to the harvester in any appropriate position by standards *a* or otherwise. This housing is turned out, so as to form three distinct cylindrical chambers, B C D, of unequal diameters, but communicating with each other, as shown in Figs. 8 and 9. Of these three chambers the lowermost one, B, is the least in diameter, and has journaled within it the reciprocating rotary shaft E E', to which a gear-wheel, F, is secured, said wheel being actuated by a rack, *f*, that may be driven by any of the operative appliances of the harvester. This shaft is composed of two semi-cylindrical members, E E', that are secured together by bolts or screws *e*, the member E having a recess or cavity, *e'*, in it, to receive the various operative parts, as hereinafter more fully explained. The upper end or head G of the aforesaid shaft is adapted to rotate within the largest chamber D, while the collar H is of such size as to fit snugly within the intermediate chamber C. The exposed end of head G is not horizontal, but has a helical surface, $g$, which terminates in a vertical shoulder at $g'$, so as to conform in shape with the top of the housing, which has a helical surface, $a'$, and an abrupt termination or shoulder, $a''$. Fitted within the shoulder $a''$ is a knife or other severing device, I. $i$ is a clamp or equivalent appliance for imparting the proper tension to the supply-cord, and also for preventing its being disengaged from the housing after being severed by the aforesaid knife I. Projecting upwardly from head G is a stock, J, slotted at $j$, for the reception of a vertically-acting push-piece, K, whose stem $k$ engages with the eccentric groove $d$ of upper chamber D. This stock has two laterally-projecting spurs, L L′, that are recessed, respectively, at $l$ $l'$, to admit the movement of a horizontally-vibrating latch, M. N is an interval or space between the inner faces of said spurs. Located beneath the spur L is a flange, O, while the other spur, L′, has a projecting stud, P, under it. $o$ $p$ are intervals between this flange and stud and the spurs L L′. Situated beneath the flange O, and connected to the inner end of the same, is a swell, $o'$, which causes the ends of the severed cord to be elevated as soon as the plunger of the device is protruded. This swell being rounded off prevents the cord jamming under said flange. Adapted to have a reciprocating vertical movement is a clamp-bar, Q, whose operating-stem $q$ is actuated by the eccentric groove $c$ of intermediate chamber C. R is a plunger, whose stem $r$ engages with the eccentric groove $b$ of the lowermost chamber B, and this stem is provided with an inclined plane, $s$, that impinges against the oblique arm $m'$ of the shaft $m$ of the horizontally-vibrating latch M. This shaft $m$ is furnished with a lateral stump, $t$, against which a spring, T, presses, the stress of the latter tending to restore the latch M to its normal or closed condition after being opened by the impingement of inclined plane $s$ against the arm $m'$. U is a spring, which effects a sudden retraction of clamp-bar Q. V is the cord to be employed for binding the bundles of cut grain.

The operating-shanks which traverse the grooves of the housing may be provided with rollers, as shown in Figs. 10, 11, 12, 13, and 15, so as to diminish friction.

The cord V, which may be coiled upon a suitable spool or reel, is first passed through the represented or any suitable tension device, $i$, and thence around the bundle of cut grain, which latter movement may be effected either by hand or else by any suitable automatic mechanism. The end of the cord is then brought back near the tension device, and as soon as the shaft E E′ has rotated a sufficient distance toward the left the bar Q is, by the action of the appropriate shoulder upon its shaft, elevated, thereby clamping the doubled portion of the cord between the upper end of said bar and the under side of stud P.

The cord being thus secured within the device, it is evident that a further rotation of the shaft E E′ will press the cord against the cutter I with sufficient force to sever a portion of said cord for the band V. After the cord has been severed, and the shaft rotated still farther to the left, so as to wind the cord into the interval $o$ $p$, the plunger R is elevated, and, simultaneously with its elevation, the latch M is opened and caused to occupy the recess $l$ of spur L. This elevation of the plunger R forces the end of the severed portion of the cord up through the interval N between the spurs L L′, which act being accomplished, the plunger is, by action of the appropriate groove or shoulder, immediately retracted; and the moment this descent is initiated the latch M flies around into the recess $l$, and thereby maintains the ends of the cord in their erect condition, and in front of that portion of said cord which occupies the interval $o$ $p$. While the ends of the cord are thus elevated and clamped by the latch M, the latter is maintained in this locked condition by the arm $m'$ of its shaft $m$ being engaged behind the inclined plane $s$ of the plunger R, as seen in Fig. 10. This forcible detention of the cord insures a more secure knot being tied in it than could be done if the latch were simply held with a spring. This inclined plane, moreover, acts with a positive motion to open the latch at the proper moment, as indicated in Fig. 15, which opening of the latch is caused by the plunger being depressed far enough to allow said inclined plane to engage behind the arm $m'$. The retraction of the plunger is effected by the shaft E being reversed in its rotation, or toward the right, which rotation is continued until the push-piece K is completely elevated, thereby forcing the bight of the cord over the rounded end of the stock J, as seen in Fig. 6. The weight of the bundle of grain then draws the bight of the cord tightly over the upturned end thereof, and in so doing forms a knot, as represented in Fig. 7; and the shaft still continuing its rotation to the right, the said ends become released, and the now bound sheaf drops from the machine, or is discharged by any suitable means. The reversed rotation of the shaft E toward the right is continued until it has assumed its normal position, when it is arrested by a stop, and the above-described operations again repeated.

The parts must have such relative connection and adjustment as for the rack which operates the shaft of the device to be moved at the proper speed, and just far enough to insure the severing and tying of the cord at the exact moment when a proper quantity of grain has been cut to make a suitable bundle.

In place of the described rack and pinion, any suitable reciprocating instrumentality may be employed.

I claim as new and of my invention—

1. The stationary hollow cylinder or housing A, containing the reciprocating stock J, said housing having in its interior surface the series of grooves, shoulders, or flanges for successive actuation of the nipping device Q P, the plunger R, latch M, spurs L L', and push-piece K, the whole being arranged and adapted to operate in the manner substantially as set forth.

2. In combination with the reversely-rotating stock J, the eccentric groove $b$ of the lowermost chamber B, and the plunger R, spurs L L', and recesses $l$.

3. In combination with the plunger R, the horizontally-vibrating spring-latch M, operated by the inclined plane $s$ on the plunger R impinging with the oblique arm $m$ of the said latch M, in the manner designated.

4. The helical-topped housing A and stock J, with the rounded head J', in combination with the latch M and push-piece K, which, at the reverse rotation of said head, is elevated by the movement of its stem $k$ in the eccentric groove $d$ in the upper chamber D, for the completion of the knot, in the manner herein set forth.

In testimony of which invention I hereunto set my hand.

JEPTHA GARRARD.

Attest:
GEO. H. KNIGHT,
O. P. CAYLOR.